Patented Apr. 26, 1949

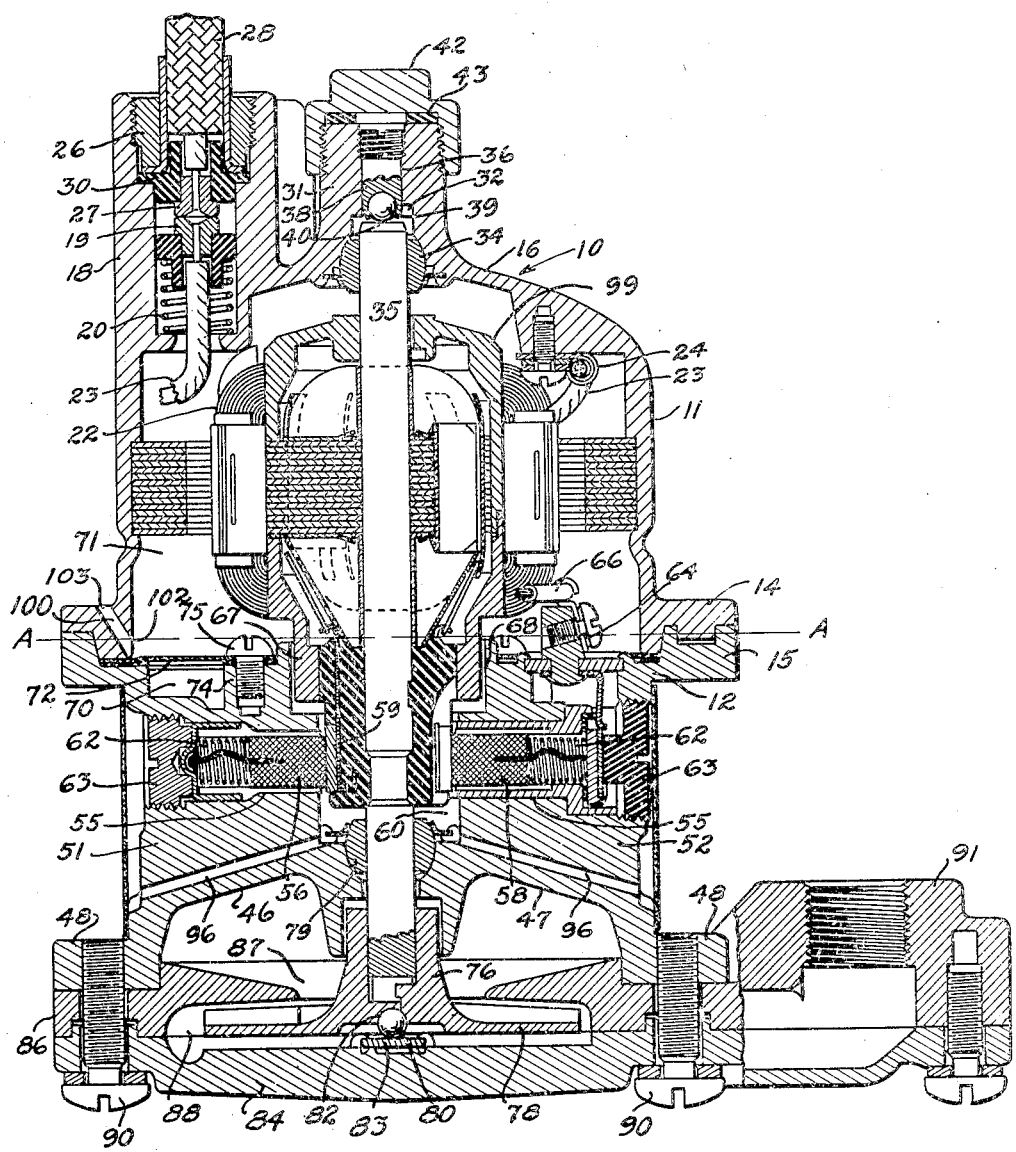
FIG. I.

2,468,187

UNITED STATES PATENT OFFICE 2,468,187

ELECTRIC FUEL PUMP

George R. Ericson, Kirkwood, Mo., assignor to Carter Carburetor Corporation, St. Louis, Mo., a corporation of Delaware Application February 7, 1947, Serial No. 727,117

5 Claims. (Cl. 103—87)

This invention relates in general to liquid pumping apparatus, and has particular reference to certain improvements in a pump and drive motor unit adapted for operation submerged in a body or pool of liquid.

In Patent No. 2,394,860 to Alfred C. Korte, there is disclosed a centrifugal pump and motor assembly provided for operation submerged in a pool of volatile liquid, and embodying provisions for the circulation of liquid in the motor housing to afford lubrication of the motor bearings and a desirable degree of motor cooling. In the arrangement according to the patent, the motor housing normally is filled with liquid, so that the motor armature runs in a liquid bath, being completely submerged therein. As a consequence thereof, the liquid bath imposes retarding forces on the armature in rotation, tending to increase the loading of the motor to an appreciable degree which, in practice, is found to be detrimental to a uniformly smooth operation of the motor.

Accordingly then, it is the principal object of the present invention to provide a pump and motor assembly which for the purpose of present example, may be of the general character shown in the aforesaid Korte patent, but which differs therefrom in the embodiment of certain improvements serving to avoid the above stated disadvantage. According to the presently improved pump unit, liquid admission to the motor housing, as well as liquid discharge therefrom, is confined to the lower portion of the housing, while air, vapors and other gaseous matter are trapped and maintained under pressure in the greater part of the housing, so that at least a major extent of the motor armature will operate in a gaseous pocket rather than in a liquid bath. In accomplishing the foregoing, the present invention contemplates the provision of means preferably constituted by a pressure relief outlet suitably arranged near the lower end of the motor housing, which is effective in conjunction with the gaseous matter trapped in the housing and compressed in consequence of pressure circulation of liquid through the lower part of the housing, for determining and maintaining the liquid circulating through the housing, at a level therein below the major extent of the motor armature, yet at an elevation sufficient to afford adequate pressure circulation of the liquid to maintain the motor commutator submerged in liquid and to assure effective lubrication of the motor bearing. Moreover, while controlled as to the liquid level thereof, the volume of liquid under pressure circulation in the lower zone of the motor housing, is fully sufficient for the absorption and removal of any excess of motor operating heat not conducted through the housing walls to the surrounding liquid pool.

Other objects and advantages of the present invention will appear from the following description of a presently preferred embodiment thereof, illustrated in the accompanying drawings, wherein:

Fig. 1 is a sectional elevation vertically through a pump and motor unit embodying the present invention;

Figure 3:
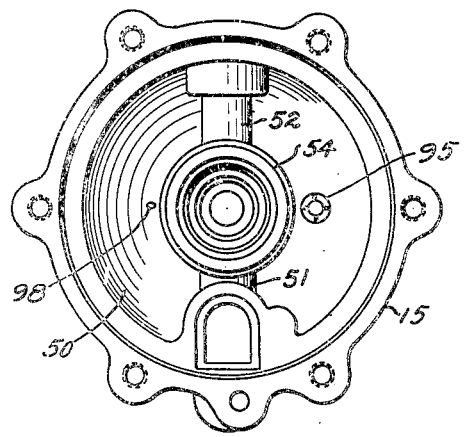
Fig. 3 is a top view of the lower part of the motor housing.

In order to afford a clear illustration of the present improvements, the pump and motor unit shown, may be and by preference is, generally similar in construction and arrangement of parts, to the unit disclosed by the hereinabove mentioned Korte patent. As appears from the several figures of the drawings, the pump drive motor indicated as a whole by the reference numeral 10, is enclosed in a two-part housing comprised of an upper casting 11 and a lower casting 12 suitably assembled, as through cooperating flanges 14 and 15 outstanding from the adjoining margins of the castings 11 and 12, respectively, and secured together by bolts (not shown). Upstanding from one side of the upper casting top wall 16 is an apertured boss 18. Within the boss is a contact 19 which is yieldingly supported on a coil spring 20, the contact being connected to motor field 22 supported in the casting 11, by a wire 23 arranged in the motor housing and supported thereon in part, as at 24 (Fig. 1). A plug 26 supporting a complementary contact 27 which is connected to a motor current supply wire 28, is threaded into the boss to bring contacts 19 and 27 into firm electrical engagement. Importantly here for a purpose to appear, the plug 26 includes a sealing sleeve 30 of suitable character, affording a liquid and air-tight seal at the boss, whereby to prevent leakage of liquid from the pond surrounding the unit, through the boss into the motor housing and conversely, leakage of gaseous matter outwardly through the boss from the housing interior. Although a sealing sleeve 30 is here utilized, it will be appreciated that the boss may be sealed in any other desired or well known manner.

Housing top wall 16 also includes a central bearing boss 31 providing an interior recess 32 having therein a journal bearing 34 for the upper end of the motor armature shaft 35. The boss is apertured at 36 outwardly from the recess 32, to receive a thrust screw 38 having a ball-end 39 in engagement with the upper terminal end 40 of the shaft 35, the thrust screw being adjustable from outside the casting. Externally threaded on the boss is a cap 42 within which is a sealing washer 43 for providing a fluid and airtight closure of the apertured boss.

Figure 2:
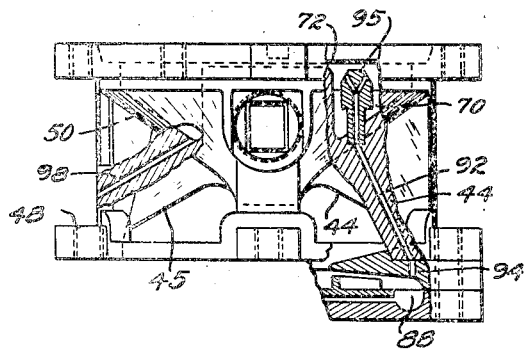
Fig. 2 is a side view of the lower part of the motor housing, with portions thereof shown in section, the view including a part of the pump assembly.

Lower housing casting 12 (Figs. 2 and 3) preferably is of generally conical shape, and is provided with external radial ribs 44 and 45 (Fig. 2) and similar ribs 46 and 47 (Fig. 1), each rib terminating in an apertured foot lug 48. The ribs 46 and 47 are extended interiorly of the conical casting wall 50, as at 51 and 52, respectively, on opposite sides of a circular wall portion 54 centrally upstanding on the wall 50 of casting part 12. Each rib extension is provided with a horizontal through-aperture 55 receiving therein one of the commutator brushes 56 and 58, the brushes in turn being constantly urged inwardly against the commutator 59 operatively located in the chamber 60 formed by circular wall 54, by coil springs 62 one between each brush and a screw plug 63 closing the outer end of the brush aperture. The extension of rib 47 supports an insulated terminal lug 64 suitably electrically connected to the brush 58 as shown in Fig. 1, and to which is connected a wire 66 leading from the motor field 22. The opposite brush 56 is grounded to the casting 12. As appears in Fig. 1, the commutator chamber 60 is partly closed for the prevention of flame propagation, by a closure-forming enlargement 67 on the motor armature, rotatable in the upper enlarged portion 68 of chamber 60.

The interior space 70 of the lower housing casting 12, extending about the central circular wall 54 thereof, provides a sediment sump and separating the sump space from the motor housing chamber 71 thereabove, is a filter screen 72. Screen 72 is maintained in assembly preferably by clamping its outer circumferential margin between the mating flanges of the housing castings, and securing its inner circular margin to a circular boss 74 integral with the wall 54, by suitable screws 75.

Motor shaft 35 is projected downwardly through the lower housing casting 12 in the zone of chamber 60, for operative connection to the hub 76 of centrifugal impeller 78 in the pump assembly. A journal bearing 79 recessed in the bottom of chamber 60, rotatably supports the shaft, while the shaft and impeller are operatively supported in the vertical direction, by a foot bearing comprising a ball element 80 preferably seated in a recess 82 in the bottom side of the impeller hub and bearing upon a plate 83 carried by the lower casing member 84 of the impeller volute casing. Member 84 cooperates with a member 86 providing the pump inlet throat 87, to form the pump volute chamber 88 in which the impeller 78 rotates, these members being secured together and in assembly to the lower motor housing casting 12 by bolts 90 threadedly engaging the foot lugs 48 on the latter. Members 84 and 86 are extended laterally at the discharge side of the volute chamber, to afford a discharge neck 91 for connection to a delivery conduit (not shown).

According to the present exemplary disclosure, a liquid pressure by-pass duct 92 (Fig. 2) open to the discharge end of the pump volute chamber 88, as at 94, is provided in the rib 44 of the motor housing casting 12, the duct terminating in a jet nozzle 95 in the sump space 70 immediately below filter screw 72. A portion of the liquid under pressure discharge by the pump, thus will be by-passed continuously during pump operation, through the duct 92 to the lower zone of the motor housing assembly, the nozzle 95 being suitably ported such as to direct the liquid admission against the filter screen, thereby tending to keep the screen clear of foreign matter. The liquid so admitted to the motor housing, circulates in the lower zone therein and over the upper edge of the wall 54 to and downwardly in the commutator chamber 60, to the motor shaft bearing 79, thus affording lubrication of the bearing 79 and maintaining the commutator submerged. From the region of bearing 79, the liquid is returned to the tank in which the pump unit is submerged, through ducts 96 provided in the ribs 46 and 47 (Fig. 1). Additionally, a duct 98 in rib 45 (Fig. 2) open at its lower end to the casing exterior, and at its upper end to the sump space 70, affords a drain for sediment accumulating in the sump.

As before described, the apertured bosses at the upper end of the motor housing casting 11 are provided with fluid tight seals, so that in the submerged position of the pump unit, gaseous matter above the liquid in motor chamber 71 will become trapped therein. Upon circulation of liquid through the lower zone of chamber 71 under a pressure determined according to the discharge pressure of the pump obtaining at the connection of the by-pass duct 92 to the discharge end of the volute chamber 88, the liquid in motor chamber 71 will tend to rise therein, compressing the trapped gaseous matter. Since it is desirable to afford liquid under flow-pressure in chamber 60 in order to assure a fully submerged condition of the commutator and adequate lubrication of the motor shaft bearing 79, the liquid return capacity of the ducts 96 is limited to this end.

Gaseous bubbles which may be entrained in the liquid circulating through the motor housing, and vapor therefrom, will rise into the motor housing and add to the gaseous volume therein.

A relief port 100 in the lower motor casing wall opens at its lower end 102, to the motor chamber 71 below the armature, and is open at its upper end 103, to the tank outside the unit. The passage thus affords by-pass of a portion of the liquid under pressure circulation in the motor chamber 71, directly to the tank from the lower end of the chamber in the zone above the screen 72. The by-pass capacity of the passage 100 is here predetermined as by selection of its sectional area, so that in normal operation of the pump unit, the rate of liquid discharge therethrough and through ducts 96 and 98 will be such as to establish and maintain a balance of the liquid and gaseous pressures in the motor chamber 71 with the liquid level substantially as indicated by the line A—A (Fig. 1), in a plane through the uppermost margin of the lower open end 102 of the relief passage. Passage 100 also serves to relieve any excess of gaseous pressure in the motor housing. In consequence thereof, the major part of the armature 99 will rotate in gas and vapor, rather than submerged in liquid, thus avoiding the disadvantage hereinbefore discussed.

While the present improvements are here shown and described as embodied in a motor-pump unit of the general form and character appearing in the aforementioned Korte Patent No. 2,394,860, it will be now appreciated that the invention is not limited to the pump unit of the patent or as herein illustrated, but may be applied with equal advantage to motor-pump units of other types provided for submerged operation.

Having now described the invention in respect to a presently preferred embodiment thereof as illustrated by the drawings, it is to be understood that the exclusive use of all modifications as come within the spirit and full intended scope of the appended claims is contemplated.

I claim:

1. In a pump assembly for operation submerged in volatile liquid, an electric motor including a shaft and armature, a housing receiving said motor with the shaft vertical therein, the upper part of said housing being fluid tight, a shaft bearing in the lower portion of said housing, receiving said shaft, a rotary pump below the housing operatively connected to said shaft, means for circulating fluid from said pump through said housing for lubricating said bearing, and a by-pass and pressure relief opening in the housing wall below the level of the lower portion of said armature and effective in co-operation with the pressure of vapors trapped in the casing upper portion during operation to determine a liquid level in the housing below the major portion of said armature.

2. In a liquid pump unit, a casing assembly providing separate, relatively spaced motor and pump chambers, an electric motor including a shaft, an armature thereon, and a lower shaft bearing, arranged in the motor chamber with the shaft extending therefrom toward the pump chamber, an impeller in the pump chamber operatively connected to the shaft extension, passage means connecting said pump and motor chambers to admit liquid to the motor chamber during pump operation, for lubricating said bearing, restricted passage means for discharging liquid from the lower portion of said bearing, and a liquid relief outlet in the lower wall of said motor chamber, the upper wall of said motor chamber being fluid tight whereby vapor and gases rising from the liquid in said motor chamber are trapped therein to the level of said relief outlet so that said armature normally operates in a gaseous atmosphere.

3. In a pump unit for operation submerged in liquid, a casing assembly providing separate, vertically spaced motor and pump chambers, an electric motor including a shaft, an armature thereon, and a shaft bearing, arranged in the motor chamber with said bearing in the lower zone thereof, said shaft extending from the motor chamber toward the pump chamber, an impeller in the pump chamber operatively connected to the shaft extension, passage means for circulating liquid under pressure from the pump chamber to and through said lower zone of the motor chamber for lubricating said bearing, the upper wall of said motor chamber being sealed so as to trap gaseous matter above the liquid therein, the liquid under pressure in the motor chamber compressing said gaseous matter, and liquid and air outlet means spaced from said passage means, for relieving the liquid and excess gaseous matter from said motor chamber, said outlet means serving thereby and in cooperation with the gaseous matter compressed in the motor chamber, to determine in respect to the liquid circulating under pressure through the chamber, a liquid level thereof which is below the major portion of the armature in the motor chamber.

4. A pumping unit for operation submerged in a body of liquid, comprising a casing assembly providing a motor chamber and a separate pump chamber therebelow, an electric motor including a shaft, an armature thereon, and a shaft bearing, arranged in the motor chamber with the shaft vertical and the shaft bearing in the lower wall of the chamber, an impeller in the pump chamber and operatively connected to said shaft, passage means extending from the pump chamber to and terminating above the lower end of said motor chamber, provided for conducting liquid under pressure to the latter chamber for lubrication of said bearing, the upper wall of said motor chamber being fluid tight for trapping gaseous matter above the liquid therein, other passage means extending from the lower end portion of the motor chamber adjacent said bearing, to the casing exterior for the discharge of liquid, the liquid under pressure in the motor chamber compressing said gaseous matter therein, and means affording a liquid outlet communicating with the motor chamber in a zone thereof above the terminal end of the first said passage means, but below said armature and, serving in cooperation with the gaseous matter compressed in said motor chamber, to determine a liquid level therein which is below the major portion of said armature.

5. In a pumping unit for operation submerged in a body of volatile liquid, a motor housing, an electric motor therein including a shaft and an armature and commutator thereon arranged vertically in the housing, and bearing means for the shaft, said bearing means and commutator being disposed in a lower zone of said housing, a pump adjacent the motor housing and including a pump impeller in driven connection with said motor shaft, means for circulating liquid under pressure from the pump through said lower zone of the housing and about said commutator and bearing means, the upper wall of said housing being fluid tight so as to trap gaseous matter rising from the liquid therein, and means comprising a passage communicating the housing interior with the body of liquid in which the pumping unit is submerged, arranged and adapted for by-passing a part of the liquid under pressure circulation in the housing and relieving excess gaseous matter from the housing, such as to determine and maintain a liquid level in the housing below the major portion of said armature therein.

GEORGE R. ERICSON.

REFERENCES CITED

The following references are of record in the file of this patent:

UNITED STATES PATENTS

| Number | Name | Date |
|---|---|---|
| 2,369,440 | Curtis | Feb. 13, 1945 |
| 2,394,860 | Korte | Feb. 12, 1946 |